United States Patent [19]
Roberts

[11] Patent Number: 6,116,367
[45] Date of Patent: Sep. 12, 2000

[54] SUSPENSION SYSTEMS

[75] Inventor: Richard Walter Roberts, Market Harborough, United Kingdom

[73] Assignee: Hendrickson Europe Limited, United Kingdom

[21] Appl. No.: 09/153,881

[22] Filed: Sep. 15, 1998

[30] Foreign Application Priority Data

Sep. 16, 1997 [GB] United Kingdom .................... 9719577

[51] Int. Cl.[7] .................................................. B62D 33/06
[52] U.S. Cl. ...................................... 180/89.15; 180/89.19
[58] Field of Search ............................. 180/89.13, 89.14, 180/89.16, 89.18, 89.19; 280/124.106, 124.152, 124.166, 124.165

[56] References Cited

U.S. PATENT DOCUMENTS

| | | | |
|---|---|---|---|
| 3,882,956 | 5/1975 | Plegat ..................................... | 180/89.14 |
| 4,451,079 | 5/1984 | Takahashi ................................ | 296/190 |
| 4,452,329 | 6/1984 | Stone et al. ............................. | 180/89.15 |
| 4,463,818 | 8/1984 | Sonneborn ............................. | 180/89.15 |
| 5,368,118 | 11/1994 | Hoefle .................................... | 180/89.12 |
| 5,590,733 | 1/1997 | Ljungholm et al. ................. | 180/89.14 |
| 5,964,310 | 10/1999 | Gyllner .................................. | 180/89.13 |

*Primary Examiner*—Kevin Hurley
*Assistant Examiner*—Lynda Jasmin
*Attorney, Agent, or Firm*—Trexler, Bushnell, Giangiorgi & Blackstone, Ltd.

[57] ABSTRACT

A suspension system for vehicles. With some vehicles, both tractor units and fixed lorries, no separate suspension is provided for the drivers cab. This can cause considerable discomfort to the driver, and changed legislation is such that with, e.g., agricultural tractors, they are not permitted on public highways unless the cab is suspended. It is desirable to provide an effective cab suspension system, an objective met by a construction including a front suspension unit, a rear suspension unit, an attachment of the front of the cab to the front suspension unit, and an attachment of the rear of the cab to the rear suspension unit, at least one of the attachments to the front and the rear of the cab being pivotal and at least one attachment being positioned at a height that is the approximate mid-height of the cab.

6 Claims, 2 Drawing Sheets

SUSPENSION SYSTEMS

This invention relates to suspension systems for vehicles.

With certain types of tractor units and fixed lorries, no separate suspension means is provided for the driver's cab, the cab being mounted directly on to the chassis or an unsprung and strategically positioned support. Even where driver cabs are provided with a suspension means, they have, hitherto, been by way of rubber blocks or simple coil springs secured between the cab bottom and the chassis or support. In both instances, the driver is subjected to considerable buffeting and discomfort.

Changed legislation relating specifically to agriculture tractors is such that they will have freedom to travel on the public highway at speeds up to 50 Kph, but conditional on the cab of the tractor being effectively suspended.

The object of the present invention is to provide a suspension means for tractor unit cabs for the greater comfort to the driver, and where the unit is an agricultural tractor, to enable that tractor to legally travel on the highway within the permitted speed limit.

According to the present invention, a suspension system for the cab of a tractor unit or fixed lorry, comprises a front suspension unit, a rear suspension unit, a means of attachment of the front of the cab to the front suspension means, and a means of attachment of the rear of the cab to the rear suspension means, at least one of the attachments to the front and the rear of the cab being pivotal and at least one attachment being positioned at a height that is the approximate mid-height of the cab.

By pivotally attaching at least one and possibly both of the front and rear suspension units to the cab at its approximate mid-height, the result is that the roll centre of the cab during the use of the vehicle is raised from the floor of the cab to the approximate mid-height of the driver. As a direct consequence of this, there is a major improvement to the comfort of the driver in tandem with the legalising of the road use of an agricultural tractor.

The springs employed in the suspension units can be coil springs or rubber suspension blocks, but the invention lends itself to the use of air suspension springs.

For best effect on the driver, it is preferred that the loading of the cab on the suspension units is in the ratio 2:1 from the back to the front. Appropriately and differently rated springs on the front and rear suspension units can achieve this, but to simplify the use of components and reduce the components required, it is preferred to use similarly rated springs and to position two on the rear suspension unit and one on the front suspension unit. By providing a single spring to the front of the vehicle, it is desirable to locate that spring to one side of suspension means, and to provide an anti-roll bar extending to and pivotally attached to a support unit to the opposite side of the suspension means. This largely eliminates any tendency for the cab to pitch and roll during use, despite only one spring being provided.

In the circumstances where the tractor unit is an agricultural tractor, it is required that the front suspension unit lies within the confines of the bonnet of the tractor, to ensure that the driver, seated in the cab can see the ground adjacent the front wheels.

Whilst ideally the suspension means to the front and the rear of the cab extend to the appropriate mid-height of the cab, for reasons of economy, without sacrificing the ride characteristics of the vehicle cab to a significant degree, it is preferred to have one (front) suspension unit extend to the approximate mid-height of the cab, and to attach the other (rear) suspension unit to the adjacent lower transverse edge of the cab.

One embodiment of the invention will now be described briefly in relation to the accompanying schematic drawings in which.

Figure 1:
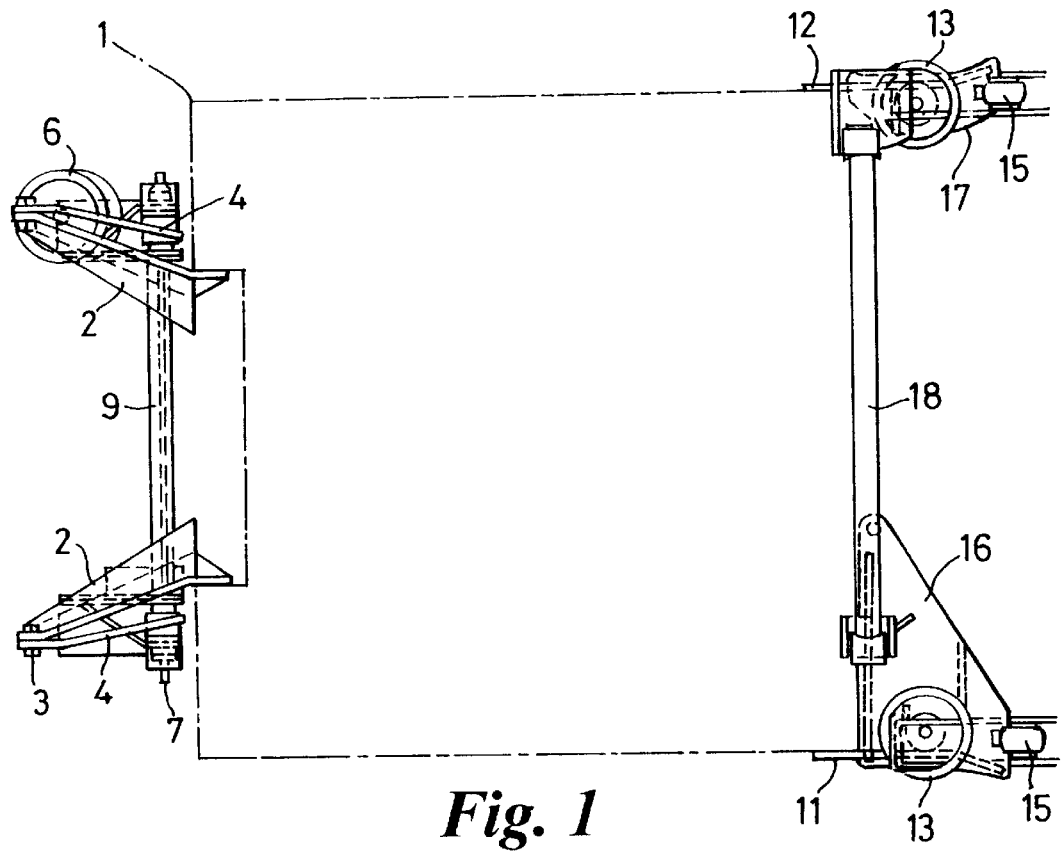
FIG. 1 is a plan view of a suspension system in accordance with the invention for the cab of a tractor unit or fixed lorry.
Figure 2:
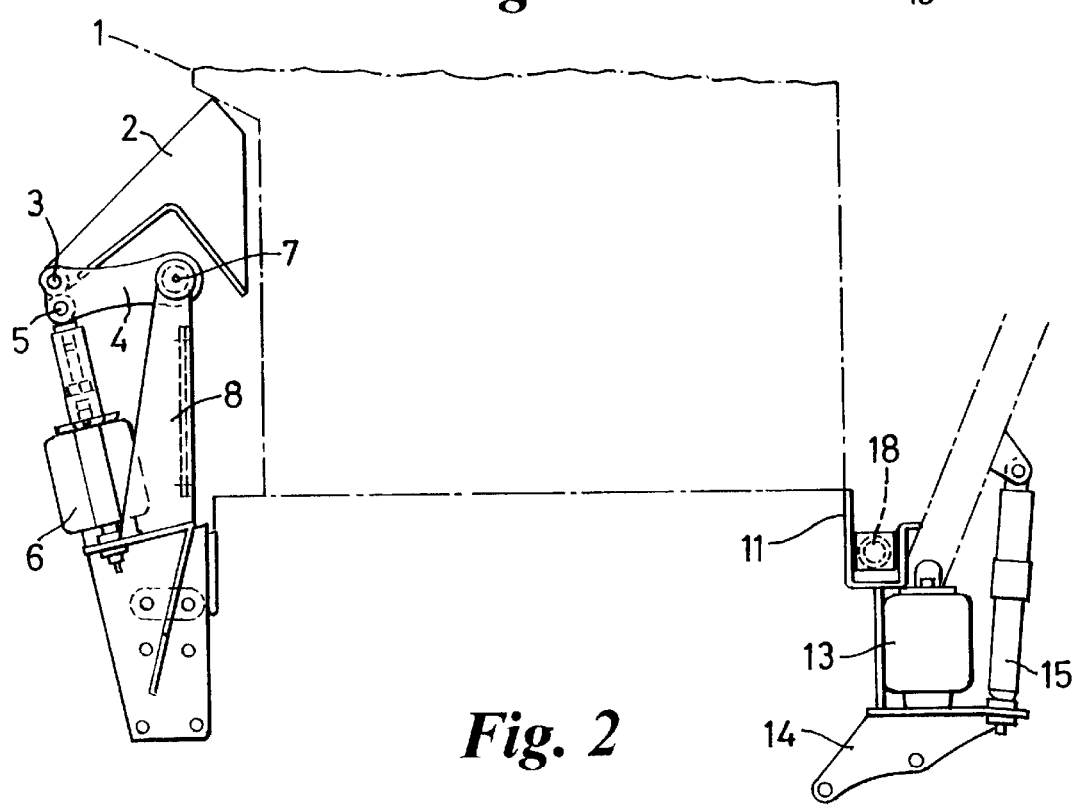
FIG. 2 is a side elevation of the suspension system of FIG. 1.
Figure 3:
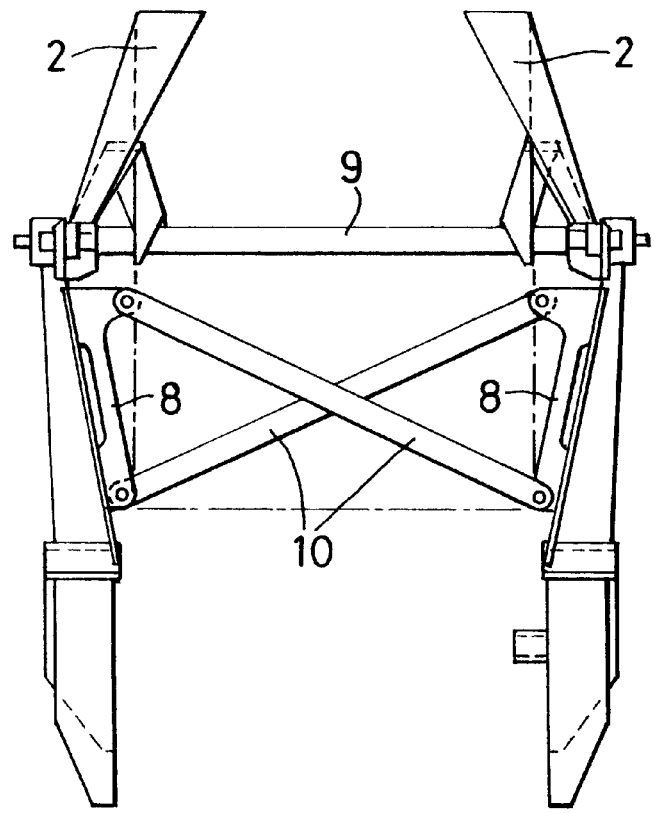
FIG. 3 is a front elevation of the front suspension of the system of FIG. 1.
Figure 4:
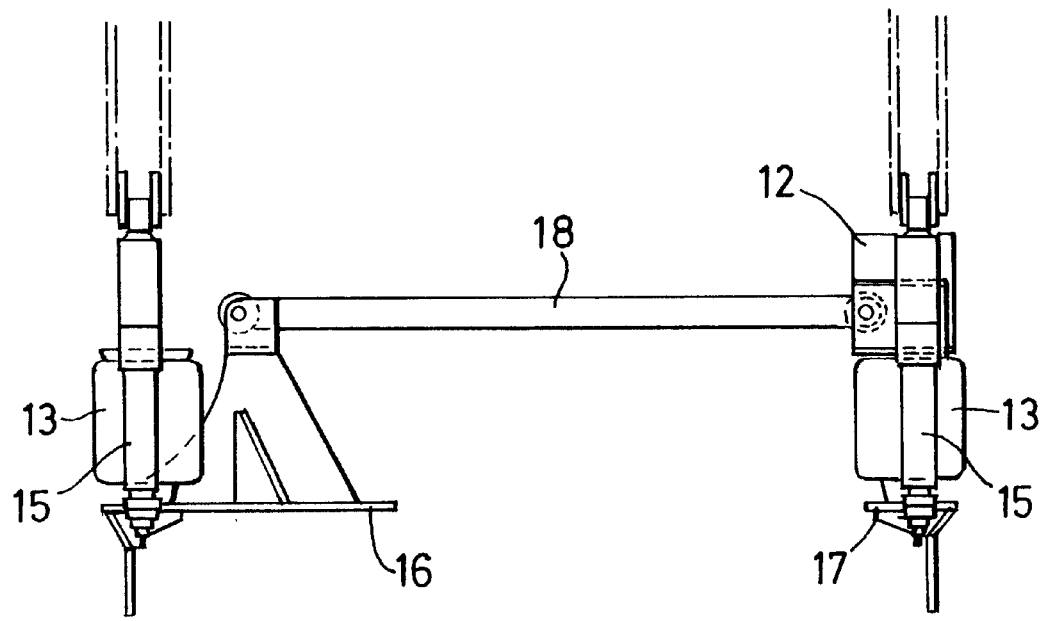
FIG. 4 is a rear elevation of the rear suspension system of FIG. 1.

In the drawings there is schematically illustrated the cab of a tractor. To the front of the cab 1 are a pair of mounting horns 2 rigidly secured to the cab steelwork to the front, and strategically located at a height on the cab such that a pivotal connection 3 to spring means is at a height that approximates to the mid-height of a driver sat in the cab.

Each horn 2 is pivoted at 3 to a respective strut 4, the strut 4 being pivoted at 5 to air spring 6, and at the opposite end pivoted at 7 to a mounting bracket 8 suitably secured to the vehicle frame or chassis. Bridging the mounting brackets 8 is an anti-roll bar 9 and the front suspension unit is strengthened by cross-braces 10 bridging the mounting brackets 8.

To the rear of the cab a rear suspension system comprises mounting brackets 11,12 secured to the cab steelwork at the bottom rear transverse corner of the cab. To each side of the rear suspension system, a respective air spring 13 is provided, the spring to one side being mounted on a support 14 on which is also mounted a shock absorber 15 extending to the cab steelwork. A bracket 16 is provided to be attached to the axle casing of the tractor, there being to the opposite side a further bracket 17 also attached to the axle casing on which is located the other air spring 13 and its respective shock absorber 15 also extending to the cab steelwork. A transverse torque rod 18 is provided bridging the brackets 12 and 16.

The invention provides a most effective suspension system for tractor units and fixed lorry cabs at large, and a suspension system eminently suited to an agricultural tractor that not only improves to a most significant degree the ride characteristics of the tractor, but also enables the agricultural tractor to be used on a public highway within the recommended speed limits.

What is claimed is:

1. A suspension system for the cab of a tractor unit or fixed lorry comprising a front suspension unit, a rear suspension unit, an attachment for the front of the cab to the front suspension unit, and an attachment for the rear of the cab to the rear suspension unit, at least one of the attachments to the front and the rear of the cab being pivotal and said pivotal attachment being positioned mid-height of the cab.

2. A suspension system as in claim 1, wherein the attachment for the front of the cab to the front suspension unit and the attachment for the rear of the cab to the rear suspension unit are pivotal, wherein at least one of the pivot attachments are positioned mid-height of the cab.

3. A suspension system for the cab of a tractor unit or fixed lorry as in claim 1, wherein air suspension springs are employed as the springs of the front and rear suspension units.

4. A suspension system for the cab of a tractor unit or fixed lorry as in claim 3, wherein the said air suspension springs have a similar rating, and one air spring is employed on the front suspension system, and two air springs are employed on the rear suspension systems.

5. A suspension system for the cab of a tractor unit or fixed lorry as in claim 4, wherein the air suspension spring on the front suspension system is located to one side, and an anti-roll bar provided extending from the air suspension spring to the opposite side of the front suspension system.

6. A suspension system for the cab of a tractor unit or fixed lorry as in claim 1, wherein the cab is the cab of an agricultural tractor and the front suspension unit does not extend beyond an outer edge of a bonnet of the tractor, whereby to enable a driver to see the ground adjacent the front wheels of the vehicle.

* * * * *